(12) United States Patent
Totsuka et al.

(10) Patent No.: US 10,834,350 B2
(45) Date of Patent: Nov. 10, 2020

(54) IMAGE SENSING DEVICE, CAMERA, AND TRANSPORTATION EQUIPMENT

(71) Applicant: CANON KABUSHIKI KAISHA, Tokyo (JP)

(72) Inventors: Hirofumi Totsuka, Fujisawa (JP); Katsuhiko Mori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 46 days.

(21) Appl. No.: 16/100,510

(22) Filed: Aug. 10, 2018

(65) Prior Publication Data
US 2019/0058842 A1    Feb. 21, 2019

(30) Foreign Application Priority Data
Aug. 15, 2017 (JP) ................. 2017-156884

(51) Int. Cl.
*H04N 5/378*   (2011.01)
*H04N 5/345*   (2011.01)
*B60R 1/00*    (2006.01)
*H04N 5/353*   (2011.01)
*H04N 5/369*   (2011.01)
(Continued)

(52) U.S. Cl.
CPC ............ *H04N 5/378* (2013.01); *B60R 1/00* (2013.01); *H04N 5/345* (2013.01); *H04N 5/3456* (2013.01); *H04N 5/3532* (2013.01); *H04N 5/3535* (2013.01); *H04N 5/3696* (2013.01); *B60R 2300/10* (2013.01); *G06T 7/20* (2013.01); *G06T 7/50* (2017.01); *G06T 2207/30252* (2013.01); *H04N 5/353* (2013.01)

(58) Field of Classification Search
None
See application file for complete search history.

(56) References Cited

U.S. PATENT DOCUMENTS 6,956,605 B1   10/2005  Hashimoto
7,593,047 B2    9/2009  Funakoshi et al.
(Continued)

FOREIGN PATENT DOCUMENTS

JP    2000-059696 A    2/2000
JP    2002-320235 A   10/2002
(Continued)

OTHER PUBLICATIONS

U.S. Appl. No. 15/977,653, filed May 11, 2018 (First Named Inventor: Hirofumi Totsuka).

*Primary Examiner* — Kaitlin A Retallick
(74) *Attorney, Agent, or Firm* — Venable LLP

(57) ABSTRACT

An image sensing device is provided. The device comprises pixels including a first pixel which belongs to a first row and a first column, a second pixel which belongs to a second row and the first column and a third pixel which belongs to the second row and a second column, and readout units including a first readout circuit connected to the first and second pixels and a second readout circuit connected to the third pixel. The device performs a first operation and a second operation after the first operation. In the first operation, signal readout from the first and third pixels are performed. In the second operation, signal readout from the second pixel is performed. A controller determines, based on the signal generated by the first operation, a control parameter using to control the second operation.

20 Claims, 12 Drawing Sheets

(51) Int. Cl.
*G06T 7/20* (2017.01)
*G06T 7/50* (2017.01)

(56) References Cited

U.S. PATENT DOCUMENTS

| | | |
|---|---|---|
| 8,154,639 B2 | 4/2012 | Kato et al. |
| 8,189,081 B2 | 5/2012 | Totsuka |
| 8,411,185 B2 | 4/2013 | Totsuka |
| 8,553,118 B2 | 10/2013 | Saito et al. |
| 8,605,182 B2 | 12/2013 | Totsuka et al. |
| 9,013,765 B2 | 4/2015 | Totsuka |
| 9,332,202 B2 | 5/2016 | Totsuka |
| 9,337,222 B2 | 5/2016 | Saito et al. |
| 9,350,958 B2 | 5/2016 | Totsuka et al. |
| 9,787,932 B2 | 10/2017 | Totsuka et al. |
| 9,838,633 B2 | 12/2017 | Muto et al. |
| 9,876,975 B2 | 1/2018 | Yoshida et al. |
| 10,003,761 B2 | 6/2018 | Totsuka et al. |
| 2005/0094012 A1 | 5/2005 | Gomi et al. |
| 2005/0237408 A1 | 10/2005 | Muramatsu |
| 2006/0203113 A1 | 9/2006 | Wada et al. |
| 2009/0059031 A1* | 3/2009 | Miyakoshi ......... H04N 5/23245 348/222.1 |
| 2010/0283881 A1* | 11/2010 | Araki ................... H04N 5/3456 348/308 |
| 2011/0285899 A1 | 11/2011 | Hirose |
| 2015/0029373 A1 | 1/2015 | Yamaguchi et al. |
| 2015/0077590 A1* | 3/2015 | Kuriyama ............ H04N 5/3745 348/231.99 |
| 2015/0296155 A1 | 10/2015 | Tanaka |
| 2016/0050377 A1* | 2/2016 | Hizi ....................... H04N 5/353 348/296 |
| 2018/0098013 A1 | 4/2018 | Yoshida et al. |
| 2018/0139396 A1 | 5/2018 | Totsuka et al. |
| 2019/0141263 A1* | 5/2019 | Takamoto ............. H04N 5/345 |

FOREIGN PATENT DOCUMENTS

| | | |
|---|---|---|
| JP | 2004-266369 A | 9/2004 |
| JP | 2005-086245 A | 3/2005 |
| JP | 2005-311821 A | 11/2005 |
| JP | 2005-348040 A | 12/2005 |
| JP | 2010-263526 A | 11/2010 |
| JP | 2011-101325 A | 5/2011 |
| JP | 2013-120956 A | 6/2013 |
| JP | 2014-187423 A | 10/2014 |
| JP | 2015-026938 A | 2/2015 |
| JP | 2015-204469 A | 11/2015 |
| JP | 2016-005104 A | 1/2016 |
| JP | 2016-208402 A | 12/2016 |

* cited by examiner

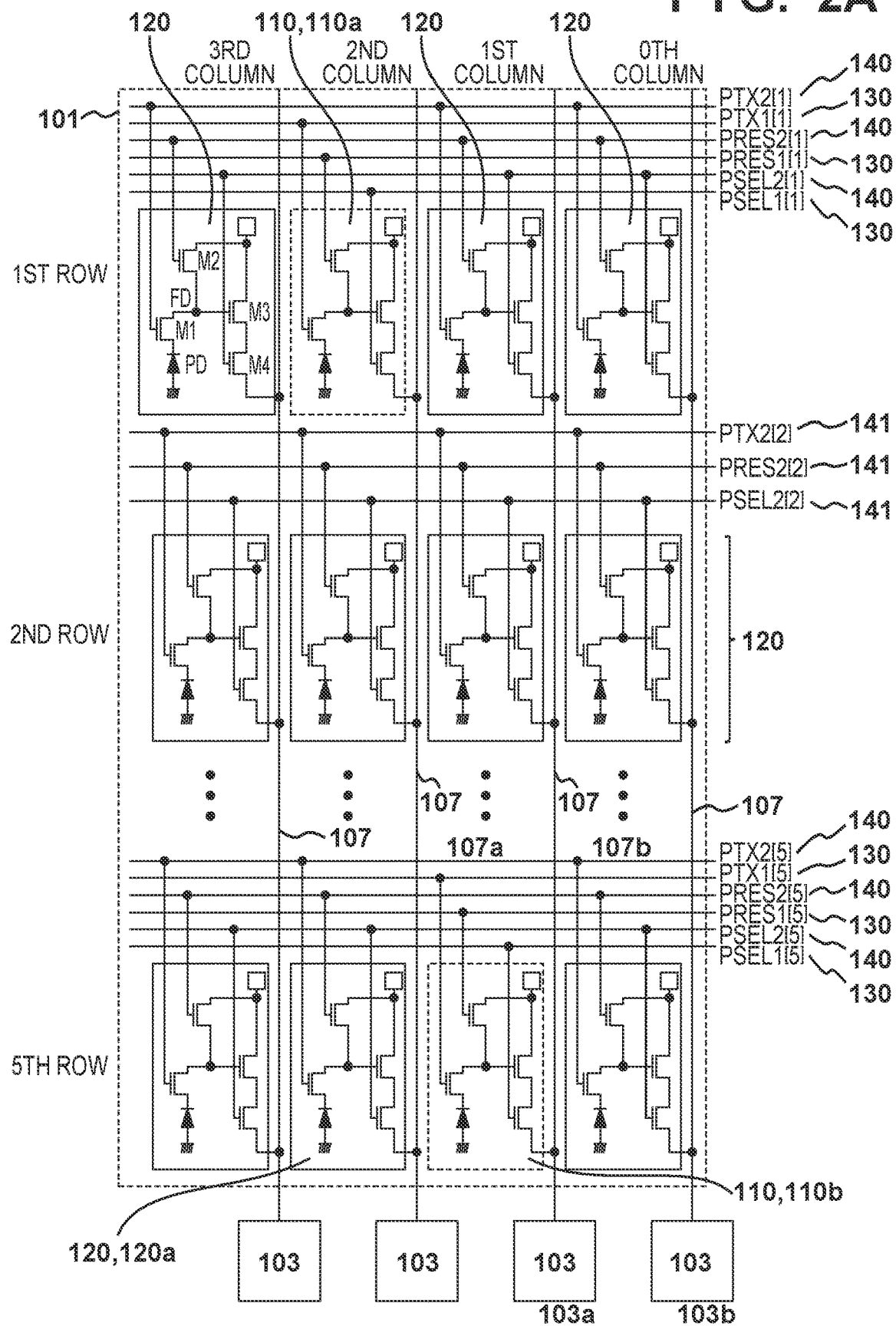

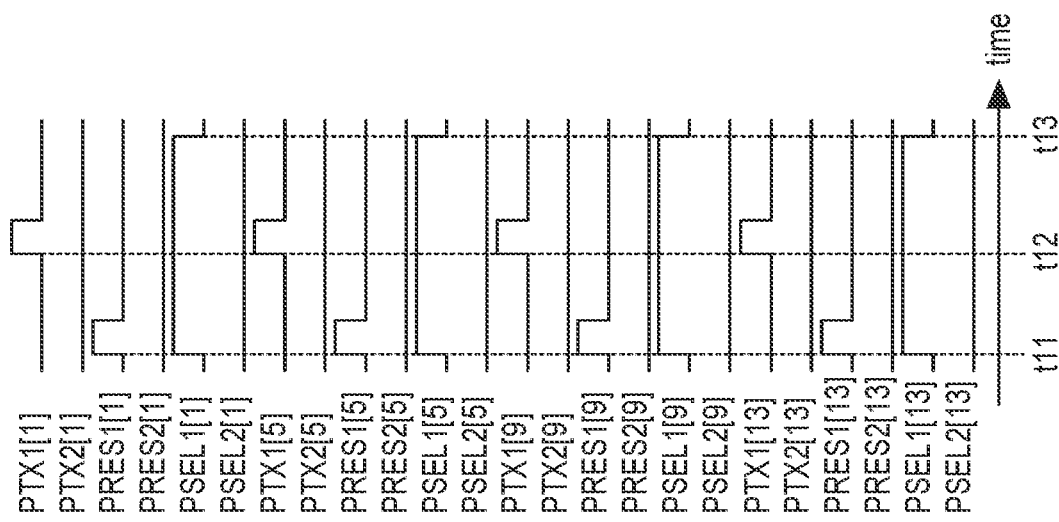
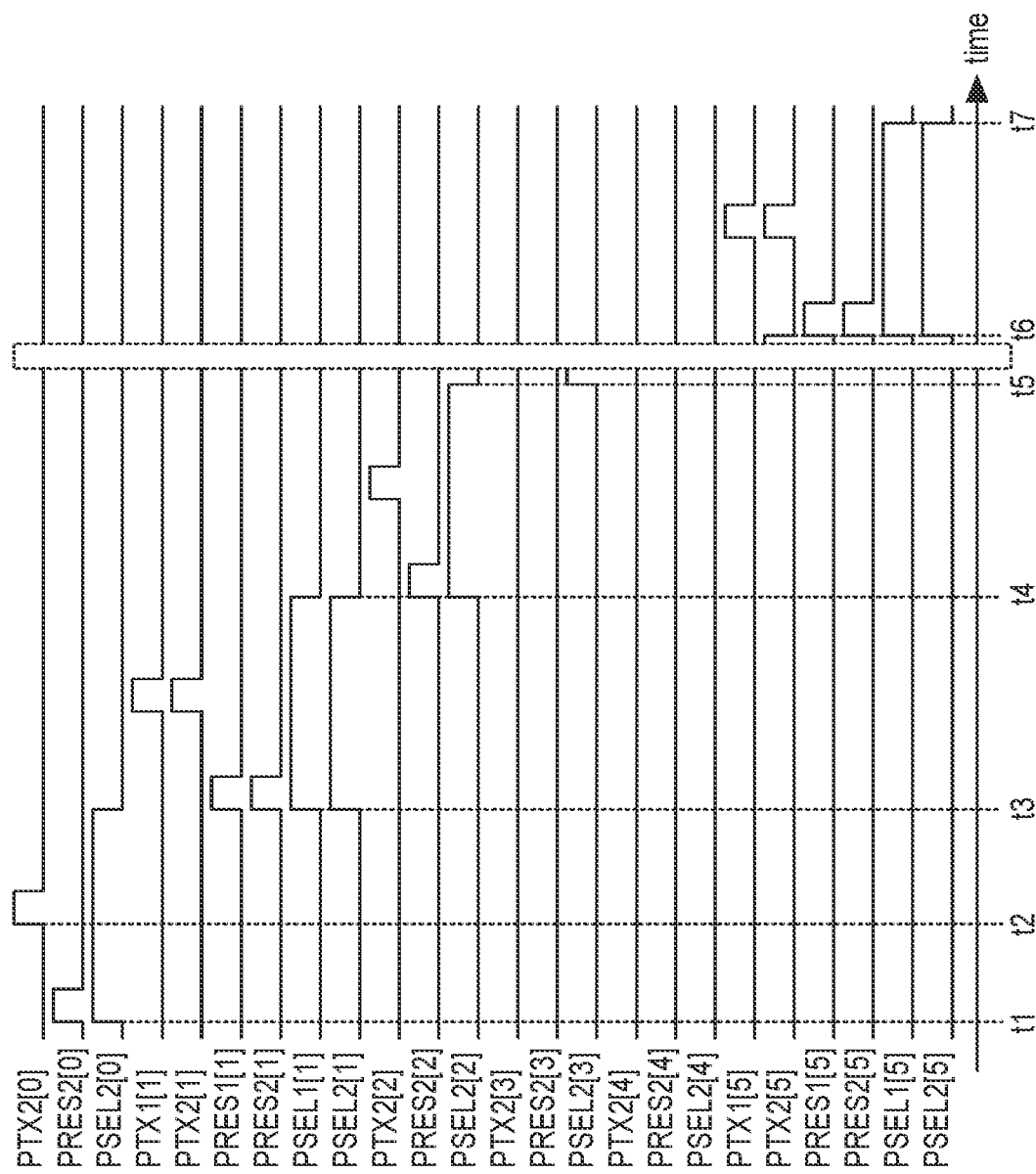

F I G. 5A
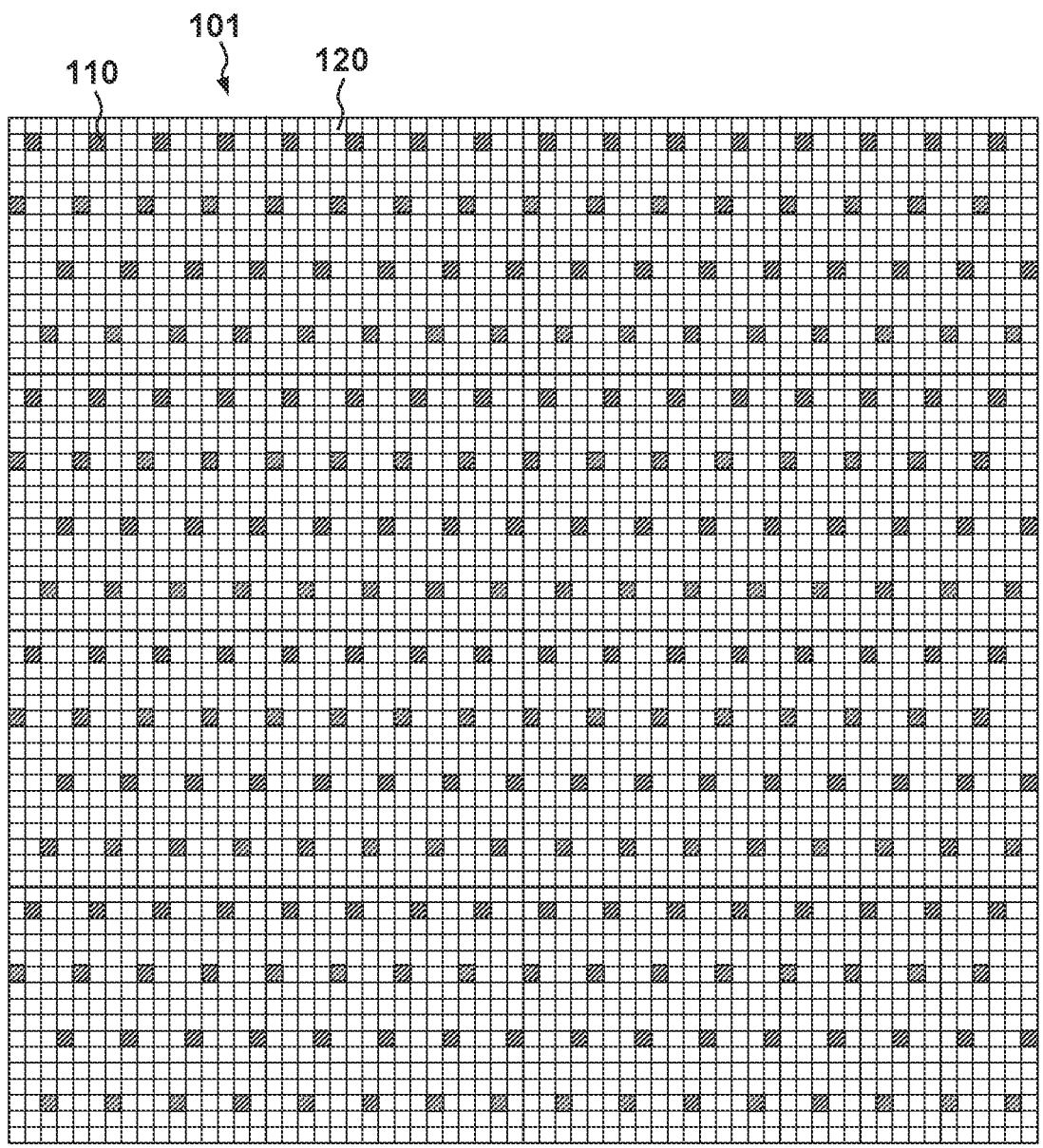

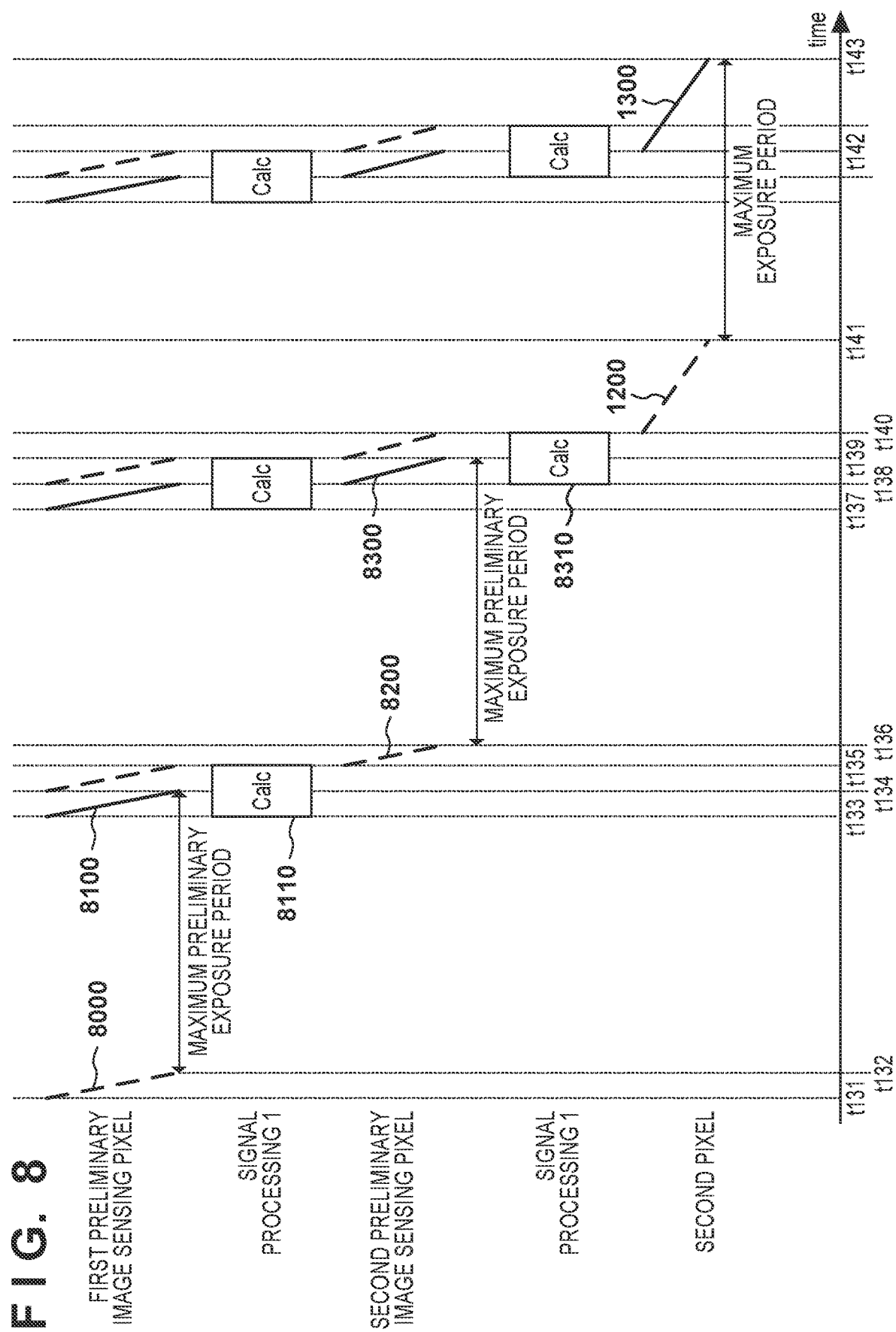

IMAGE SENSING DEVICE, CAMERA, AND TRANSPORTATION EQUIPMENT

BACKGROUND OF THE INVENTION

Field of the Invention

The present invention relates to an image sensing device, a camera, and a transportation equipment.

Description of the Related Art

An image sensing device using a CMOS circuit is widely used in digital cameras, digital camcorders, monitoring cameras, and the like. Japanese Patent Laid-Open No. 2002-320235 discloses a CMOS image sensor that has, in addition to a mode for reading out signals from all of the pixels arranged in a pixel array, a mode for thinned-out reading of pixel signals when reduced image signals are to be output. Japanese Patent Laid-Open No. 2005-86245 discloses a solid-state image sensing device that reduces the number of pixels which are read out for each frame to improve the frame rate and alternately reads out, for each frame, an image sensing signal such as that for a moving image and an image-sensing target recognition signal such as that for autofocus.

SUMMARY OF THE INVENTION

Since Japanese Patent Laid-Open Nos. 2002-320235 and 2005-86245 each have an arrangement in which signal readout is performed for each row when only signals from some of the pixels which are arranged in a pixel array are to be read out, the readout operation time can be long if the pixels whose signals are to be read out are arranged over a plurality of rows.

The present invention provides a technique advantageous in reducing the readout time when signals are to be read out from some of the pixels which are arranged in a pixel array.

According to some embodiments, an image sensing device that comprises a pixel array in which a plurality of pixels are arranged in a matrix and a plurality of readout circuits configured to read out signals from the pixel array, the plurality of pixels comprising a first pixel which belongs to a first pixel row of the pixel array and a first pixel column of the pixel array, a second pixel which belongs to a second pixel row of the pixel array and the first pixel column of the pixel array, and a third pixel which belongs to the second pixel row of the pixel array and a second pixel column of the pixel array, and the plurality of readout units comprising a first readout circuit connected to the first pixel and the second pixel and a second readout circuit connected to the third pixel, wherein the image sensing device performs a first image sensing operation and performs a second image sensing operation after the first image sensing operation, wherein in the first image sensing operation, signal readout from the first pixel by the first readout circuit and signal readout from the third pixel by the second readout circuit are performed simultaneously, and wherein in second image sensing operation, signal readout from the second pixel by the first readout circuit is performed, and wherein a controller determines, based on the signal generated by the first image sensing operation, a control parameter which is to be used to control the second image sensing operation, is provided.

Further features of the present invention will become apparent from the following description of exemplary embodiments (with reference to the attached drawings).

BRIEF DESCRIPTION OF THE DRAWINGS

FIGS. 2A to 2C are views each showing an example of the arrangement of a pixel array of the image sensing device of FIG. 1;

FIG. 3 is a timing chart of a full pixel readout operation of the image sensing device of FIG. 1;

FIG. 4 is a timing chart of a thinned-out reading operation of the image sensing device of FIG. 1;

FIGS. 5A and 5B are a view showing an example of the arrangement of the pixel array and a timing chart of the thinned-out reading operation, respectively, of the image sensing device of FIG. 1;

FIG. 8 is a timing chart of an operation of the image sensing device which includes the pixel array of FIG. 7;

DESCRIPTION OF THE EMBODIMENTS

Figure 1:
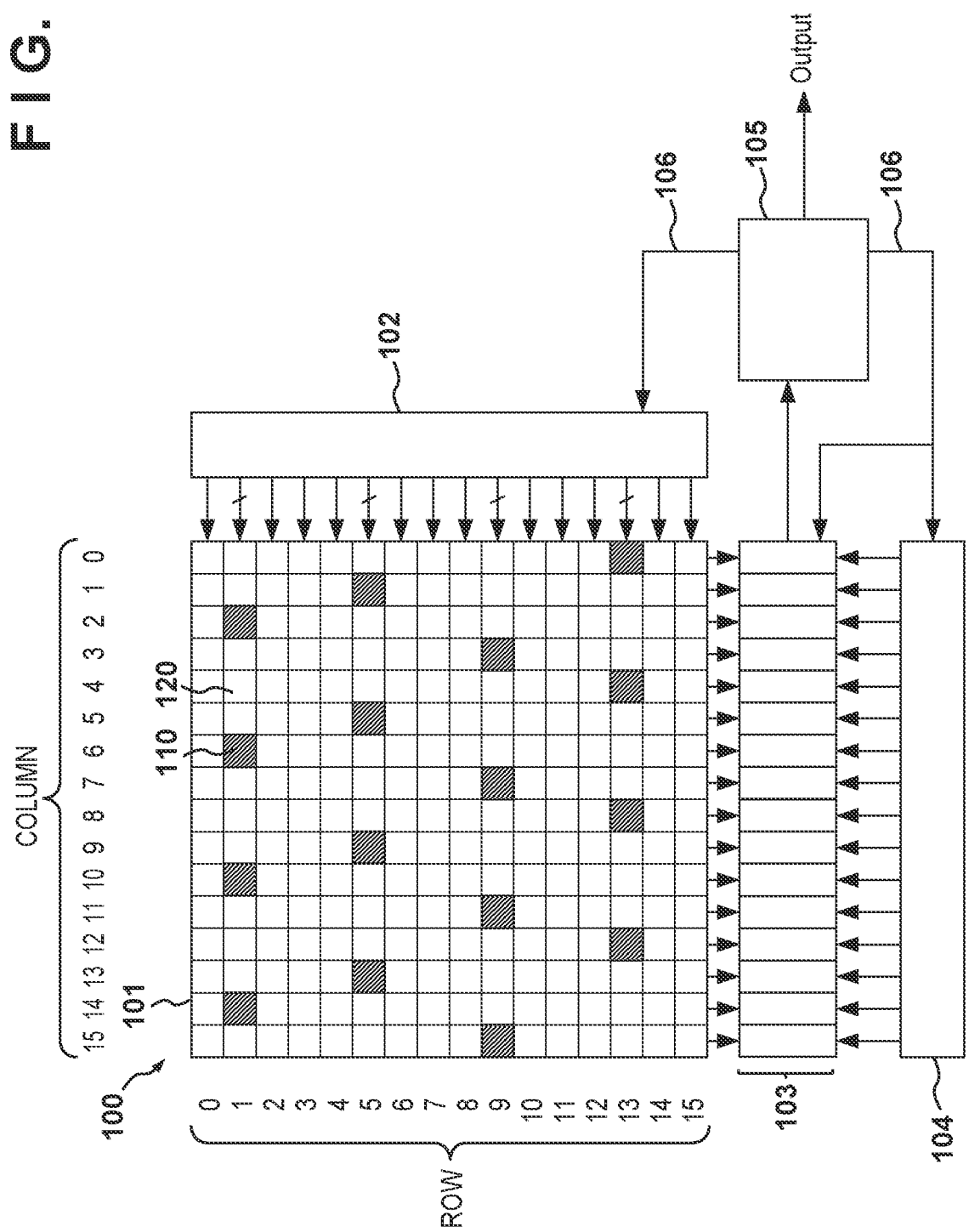
FIG. 1 is a view showing an example of the arrangement of an image sensing device according to an embodiment of the present invention.

A detailed embodiment of an image sensing device according to the present invention will now be described with reference to the accompanying drawings. Note that in the following description and drawings, common reference numerals denote common components throughout a plurality of drawings. Hence, the common components will be described by cross-reference to the plurality of drawings, and a description of components denoted by common reference numerals will be appropriately omitted.

An arrangement and an operation of the image sensing device according to the embodiment of the present invention will be described with reference to FIGS. 1 to 10B. FIG. 1 is a view showing an arrangement of an image sensing device 100 according to an embodiment of the present invention. The image sensing device 100 includes a pixel array 101, a vertical scanning circuit 102, readout circuits 103, a horizontal scanning circuit 104, a controller 105, and a control parameter line 106.

A plurality of pixels, on which photoelectric conversion elements are arranged, are arranged in a matrix in the pixel array 101. Here, in FIG. 1, a lateral direction is called a row direction (horizontal direction), and a longitudinal direction is called a column direction. In the arrangement shown in FIG. 1, 16 rows, of which the uppermost end is the 0th row and the lowermost end is the 15th row, and 16 columns, of which the rightmost end is the 0th column and the leftmost end is the 15th column, of pixels are arranged in the pixel array 101. The vertical scanning circuit 102 selects pixels arranged in the row direction. The readout circuit 103 is arranged for each column and reads out a signal, via a column signal line of each row, from each pixel in a row that has been selected by the vertical scanning circuit 102. The controller 105 processes the signals from the readout circuits 103 which are scanned by the horizontal scanning circuit 104 and feeds back the generated control parameters to the vertical scanning circuit 102 and the readout circuits 103 by using the control parameter line 106. The controller 105 may control the components of the image sensing device 100, such as the vertical scanning circuit 102, the readout circuits 103, and the horizontal scanning circuit 104. Note that a pixel color can be associated with each pixel of the pixel array 101 by using a color filter array. A color filter array can, for example, employ a Bayer array in which green pixels are assigned to a diagonal pixel pair of 2×2 pixels and a red pixel and a blue pixel are assigned to the remaining two pixels.

Pixels arranged in the pixel array 101 includes a plurality of first-type pixels 110 which are used in the thinned-out reading operation (to be described later) and a plurality of second-type pixels 120 which are not used in the thinned-out reading operation but are used for image generation. The first-type pixels 110 can be referred to as thinned-out reading pixels and the second-type pixels 120 can be referred to as non-thinned-out reading pixels or normal readout pixels. Note that when reading out the second-type pixels 120, the first-type pixels 110 can also be read out without executing a thinning operation in the same manner as the second-type pixels 120. Although the first-type pixels 110 and the second-type pixels 120 can be distinguished from each other in the point that their respective readout methods are different, they may have the same pixel structure. Here, a row in which the first-type pixel 110 and the second-type pixel 120 are arranged in the row direction will be called a first-type pixel row. In other words, the pixel array 101 includes a plurality of first-type pixel rows each including at least one first-type pixel of the plurality of first-type pixels 110 and one of the plurality of second-type pixels 120. The pixel array 101 also includes a plurality of second-type pixel rows in which only the second-type pixels 120, other than the first-type pixels, are arranged in the row direction. In each first-type pixel row, at least one second-type pixel 120 is arranged between adjacent first-type pixels 110. Also, at least one row of pixels other than the first-type pixels, more specifically, a pixel row formed by only the second-type pixels 120 is arranged between adjacent first-type pixel rows. In the arrangement shown in FIG. 1, the first-type pixel 110 is arranged for every 4 pixels (4 rows) in the column direction and for every 4 pixels (4 columns) in the row direction. Furthermore, in each first-type pixel row, there are a plurality of types of positions where the first-type pixels 110 are to be arranged in the row direction. For example, among the plurality of first-type pixel rows, note the 1st row of the first-type pixel rows (to be referred to as the 1st row hereinafter) in the pixel array 101 and the 5th row of the first-type pixel rows (to be referred to as the 2nd row hereinafter) which is adjacent to the 1st row of the first-type pixel rows in the pixel array 101. The columns where the first-type pixels 110, of the plurality of first-type pixels 110, which are arranged in the 1st row are positioned are different from the columns where the first-type pixels 110, of the plurality of first-type pixels 110, which are arranged in the 2nd row are positioned. In this manner, the first-type pixels 110 may be arranged in different columns in adjacent first-type pixel rows. In the arrangement shown in FIG. 1, the first-type pixels 110 are arranged so as to be positioned at different columns from each other in the pixel array 101 in which pixels are arranged in 16 rows×16 columns.

FIG. 2A shows the connection relation of the plurality of readout circuits 103 arranged for the respective columns in correspondence with the first-type pixels 110, second-type pixels 120, the vertical scanning circuit 102, and the pixel array 101. FIG. 2A shows the 1st, 2nd, and 5th rows and 0th to 3rd columns of the pixel array 101. The first-type pixels 110 and the second-type pixels 120 each include a photoelectric conversion element PD, a floating diffusion region FD, and transistors M1 to M4. The transistor M1 is a transfer transistor that transfers, to the floating diffusion region FD, charges converted from light and accumulated by the photoelectric conversion element PD. The transistor M2 is a reset transistor for resetting the photoelectric conversion element PD and the floating diffusion region FD. The transistor M3 is a source-follower transistor that converts the charges transferred to the floating diffusion region FD into a voltage signal and outputs the converted signal. The transistor M4 is a selection transistor for outputting a signal generated from light incident on each pixel to a corresponding column signal line 107 arranged along the column direction.

A signal line group 130 for controlling the first-type pixels 110 and a signal line group 140 for controlling the second-type pixels 120 are arranged in the first-type pixel rows (the 1st row and the 5th row) from the vertical scanning circuit 102. A signal line group 141 for controlling the second-type pixels 120 is arranged in each pixel row (the 2nd row) in which only the second-type pixels 120 are arranged. Each of the signal line groups 130, 140, and 141 includes a signal line PTX (transfer control signal line) for controlling the transistor M1, a signal line PRES (reset control signal line) for controlling the transistor M2, and a signal line PSEL (row selection signal line) for controlling the transistor M4. Each of the signal lines PTX, PRES, and PSEL can extend in the row direction crossing the column direction in which each column signal line extends. In FIG. 2A, "1" is added to the reference symbol of each of the signal lines PTX, PRES, and PSEL that is connected to the first-type pixels 110, and "2" is added to the reference symbol of each of the signal lines PTX, PRES, and PSEL that is connected to the second-type pixels 120. The number in brackets following the reference symbol of each of the signal lines PTX, PRES, and PSEL indicates the row number.

Figure 2B:
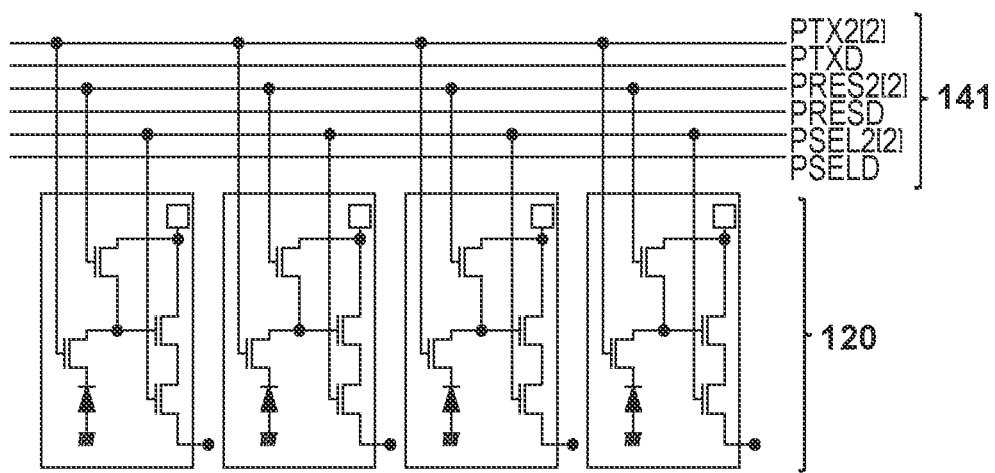
Figure 2C:
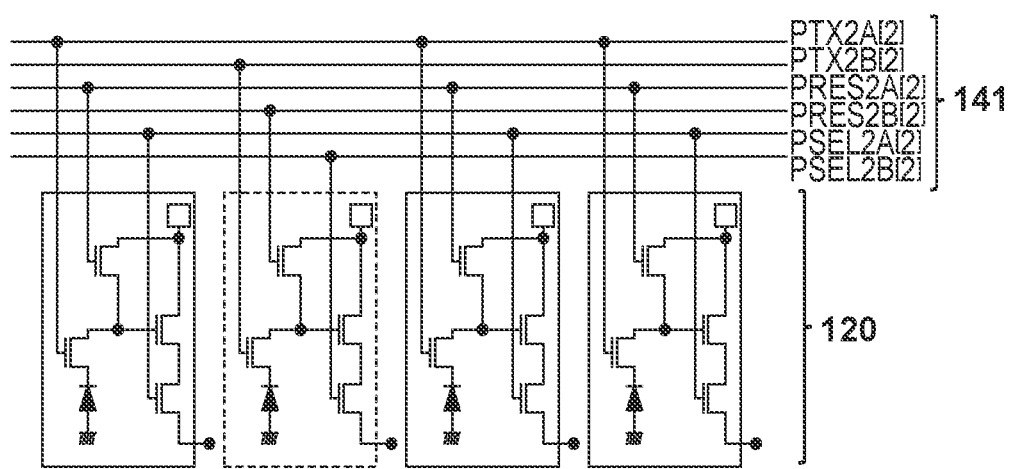

In the arrangement shown in FIG. 2A, a total of three signal lines are arranged as the signal line group 141 in the 2nd pixel row in which the first-type pixels 110 are not arranged and only the second-type pixels 120 are arranged. However, the present invention is not limited to this arrangement. For example, to ensure the opening of the photoelectric conversion element PD and a uniform parasitic capacitance of the floating diffusion region FD, wiring lines may be added so that it will have six signal lines which is the same number of lines as that of each first-type pixel row. In other words, the total number of signal lines of the signal line group 130 and the signal line group 140 may be the same as the number of signal lines of the signal line group 141. The wiring lines to be added to the signal line group 141 may be, as shown in FIG. 2B, dummy signal lines PTXD, PRESD, and PSELD which are not connected to any of the second-type pixels 120. The signal lines which are to be added to the signal line group 141 may be a second signal line group which is connected to some of the second-type pixels 120 of the same number as the first-type pixels 110 arranged in the first-type pixel row in the plurality of second-type pixels 120 as shown in FIG. 2C. By adding a second signal group, the output wiring line load from the vertical scanning circuit 102 can be made equal in the first-type pixel rows and pixel rows other than the second-type pixel rows. In this case, for example, as shown in FIG. 2C, the second-type pixel 120 at the 2nd column of each of the 0th, 2nd, and 3rd pixel rows may be connected to signal lines PTX2B, PRES2B, and PSEL2B of the signal line group 141. That is, the connection relation between the signal line group 141 and the second-type pixel 120 of in the second column of each of the 0th, 2nd, and 3rd pixel rows may be the same as the connection relation between the signal line groups 130 and 140 and the first-type pixels 110 and the second-type pixels 120 of the 1st first-type pixel row. In the same manner, the connection relation between the 5th row and the 4th, 6th, and 7th rows, the connection relation between the 9th row and the 8th, 10th, and 11th rows, and the connection relation between the 13th row and the 12th, 14th, and 15th rows may be the same.

The operation of the image sensing device 100 will be described next. FIG. 3 is a timing chart of a readout operation performed to read out signals from all of the pixels arranged in the pixel array 101. FIG. 3 shows the timings at which signals are read out from pixels belonging to the 0th row to the 5th row of the pixel array 101.

At time t1, the transistor M2 resets the floating diffusion region FD by supplying a Hi signal to a signal line PSEL2 [0] and a signal line PRES2 [0]. When the transistor M4 executes an ON operation (changes to a conductive state) simultaneously with the resetting of the floating diffusion region FD, the 0th row changes to the selected state, and a reset level is output from the transistor M3 via the transistor M4 to the corresponding column signal line 107. Subsequently, when a signal line PRES [0] changes to a Lo signal, the reset level of the 0th row is read out by the readout circuit 103 of each column.

Next, at time t2, accumulated charges are transferred from each photoelectric conversion element PD to the corresponding floating diffusion region FD when a Hi signal is supplied to a signal line PTX2 [0]. When the signal line PTX2 [0] changes to a Lo signal, the signal level of the 0th row is read out by the readout circuits 103. Correlated double sampling processing can be performed on the readout reset level and signal level in each readout circuit 103 or in the controller 105.

At time t3, the 0th row is set to an unselected state when the transistor M4 is changed to an OFF operation (a release state) by the signal line PSEL2 [0] changing to a Lo signal. The time from time t1 to time t3 is the readout time of one row. At time t3, the readout operation of all of the pixels in the 1st row is started when a Hi signal is supplied simultaneously to each of signal lines PRES1 [1], PRES2 [1], PSEL1 [1], and PSEL2 [1], and the readout operation ends at time t4. Subsequently, each row is sequentially scanned in the same manner, and signals are read out from the pixels belonging to the row.

A thinned-out reading operation of reading out signals from only the first-type pixels 110 among the pixels arranged in the pixel array 101 will be described next. FIG. 4 is a timing chart of the thinned-out reading operation.

At time t11, a Hi signal is supplied to only signal lines PSEL1 and PRES1 of the 1st, 5th, 9th, and 13th rows which are the first-type pixel rows, and the first-type pixels 110 of each of the first-type pixel rows are reset. Subsequently, each signal line PRES1 changes to a Lo signal, and the reset level is read out. Next, at time t12, a Hi signal is supplied to only a signal line PTX1 of each first-type pixel row, the signal level of each first-type pixel row is read out when the signal line PTX1 changes to a Lo signal. Next, at time t13, the signal line PSEL1 of each first-type pixel row changes to a Lo signal and the readout of each first-type pixel row ends.

In this embodiment, as shown in FIG. 1, the first-type pixels 110 of the 1st, 5th, 9th, and 13th rows are arranged in different columns from each other. Hence, signals from the first-type pixels 110 arranged in the manner described in FIG. 4 can be simultaneously read out by the readout circuits 103 arranged in corresponding columns within the readout time of one row from time t11 to time t13. In this manner, when signals are to be read out from some of the pixels arranged in the pixel array 101, the speed of the thinned-out reading operation can be increased by simultaneously reading out the signals from the first-type pixels 110 arranged in different columns.

In the readout operation in which the readout circuits 103 read out signals from the plurality of first-type pixels 110, the controller 105 causes the first-type pixels 110 which are arranged in different columns of the plurality of first-type pixels 110, to connect to corresponding different column signal lines 107 among the plurality of column signal lines 107. As a result, in the image sensing device 100, signals from at least two or more first-type pixels 110 arranged in two first-type pixel rows among the plurality of first-type pixel rows can be read out simultaneously by the readout circuits 103 arranged in corresponding columns. More specifically, in the arrangement shown in FIG. 2A, for example, the plurality of pixels include a first-type pixel 110a which is arranged in the 1st pixel row and the 2nd pixel column of the pixel array and a first-type pixel 110b which is arranged in the 5th pixel row and the 1st pixel column of the pixel array. The plurality of pixels also include a second-type pixel 120a arranged in the 5th pixel row and the 2nd pixel column of the pixel array. The plurality of readout circuits 103 include a readout circuit 103a which is connected to the first-type pixel 110a and the second-type pixel 120a and a readout circuit 103b which is connected to the first-type pixel 110b. This arrangement allows the readout circuit 103a to read out a signal from the first-type pixel 110a and the readout circuit 103b to read out a signal from the first-type pixel 110b simultaneously. A signal is not read out from the second-type pixel 120a which is connected to a column signal line 107a as in the first-type pixel 110a, and a signal is read out from the second-type pixel 120a at a separate timing. In the same manner, a signal is not read out from another second-type pixel 120 which is connected to a column signal line 107b as in the first-type pixel 110b, and a signal is read out from the second-type pixel 120 at another timing. That is, when signals are to be read out simultaneously from the first-type pixels 110a and 110b, signals are not read out from pixel rows which are arranged between the first-type pixel rows (the 1st pixel row and the 5th pixel row in the arrangement of FIG. 2A) in which the first-type pixels 110a and 110b are arranged respectively.

Figure 5B:
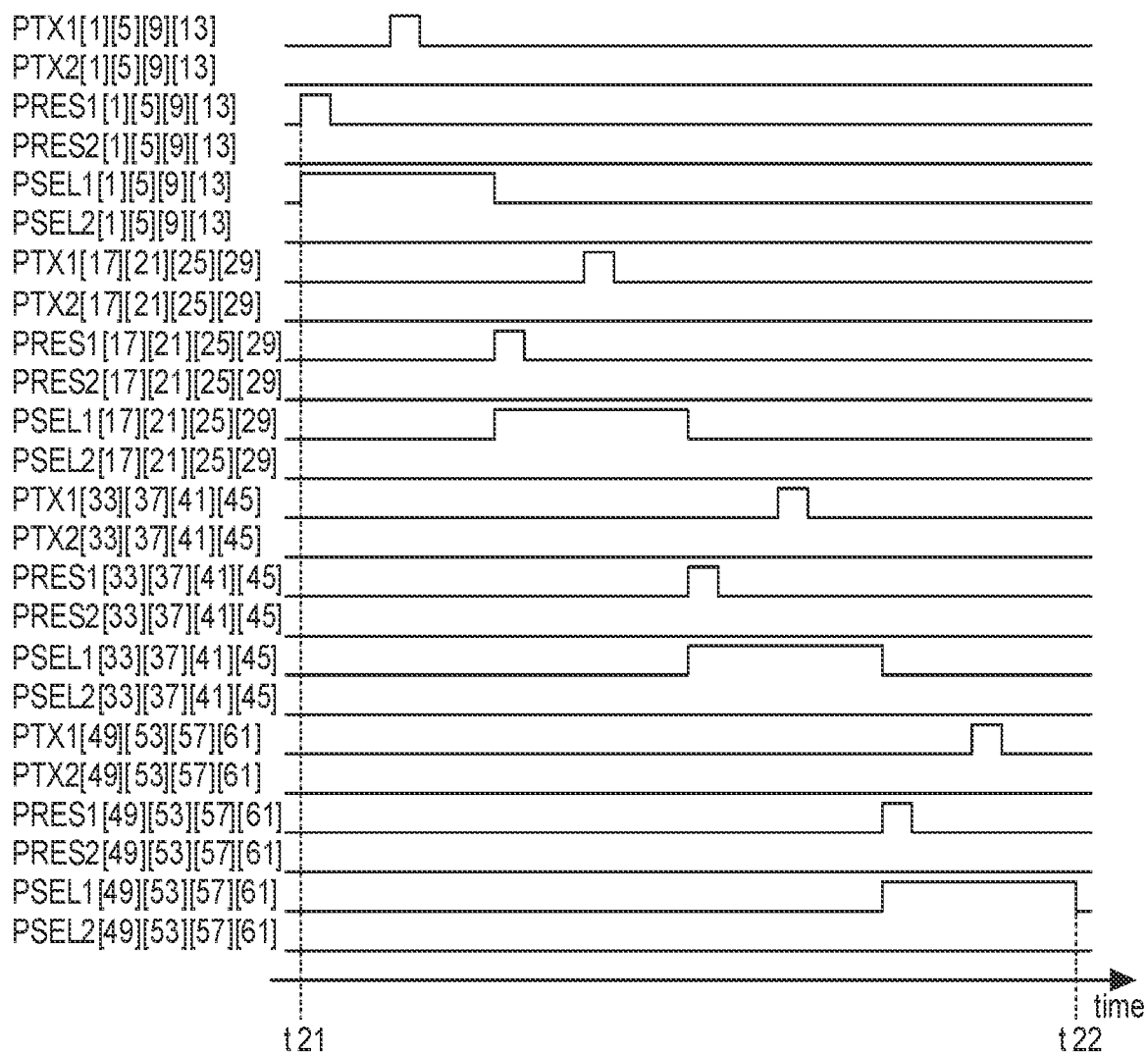

The timing chart of FIG. 4 described an example using the pixel array 101 that includes 16 rows×16 columns of pixels. However, the arrangement of the pixel array 101 is not limited to this. For example, FIG. 5B is a timing chart of the thinned-out reading operation performed in the pixel array 101 that includes 64 rows×64 columns of pixels in which the first-type pixels 110 are arranged at the same regularity as in FIG. 1 as shown in FIG. 5A. In this case, of the first-type pixels 110 which are present in the 64 rows and are to be arranged in the first-type pixel rows, the first-type pixels 110 of the 1st, 5th, 9th, and 13th rows are read out in the readout time of one row. Subsequently, the readout of 17th, 21st, 25th, and 29th rows, the readout of 33rd, 37th, 41st, and 45th rows, and the readout of 49th, 53rd, 57th, and 61st rows can be performed so that signals from all of the first-type pixels 110 can be read out in the readout time of four rows from time t21 to time t22.

In this manner, in each of the plurality of first-type pixel rows, each of the plurality of first-type pixels 110 is arranged for every M pixels (M columns), and the plurality of first-type pixel rows are arranged for every N pixels (N rows) in the pixel array 101. In the readout operation of reading out signals from the first-type pixels 110, signals are read out simultaneously from the first-type pixels 110 belonging to continuous L first-type pixel rows of the plurality of first-type pixel rows. This can increase the speed of the thinned-out reading operation. In this case, L, M, and N each are a positive integer not less than 2 and may be a positive integer not less than 3. If M and N each are not less than 3, a sufficient range of pixels can be subjected to readout at high speed by executing thinned-out reading. L, M, and N may be different from each other, two of the integers may be different from each other, two of integers may be the same, or all may be the same. To reduce the distortion of an image that is obtained by thinned-out reading, M and N may be equal (M=N). In this example, L, M, and N all have the same integer of 4. In this manner, the relation between L, M, and N may at least satisfy one of the relations of at least one of L, M, and N being not less than 3 and at least two of L, M, and N being equal to each other. Also, in consideration of the balance between the readout speed and the image quality, it may be set so that L is not less than ½ of M, L may be not more than double of M (M/2≤L≤2×M), L is not less than ½ of N, and L may be not more than double of N (N/2≤L≤2×N).

This embodiment has described how, in a case in which signals are to be read out from only some of the pixels arranged in the pixel array 101, the speed of the thinned-out reading operation can be increased by arranging the first-type pixels 110 at suitable positions. Next, the embodiment will describe a processing operation in which the suitable image sensing condition by determining, based on the information of an image sensing operation by the first-type pixels 110 whose reading operation speed has been increased, a control parameter for the signals of the second-type pixels 120 of the next readout operation and tracking a high-speed moving object.

Figure 6:
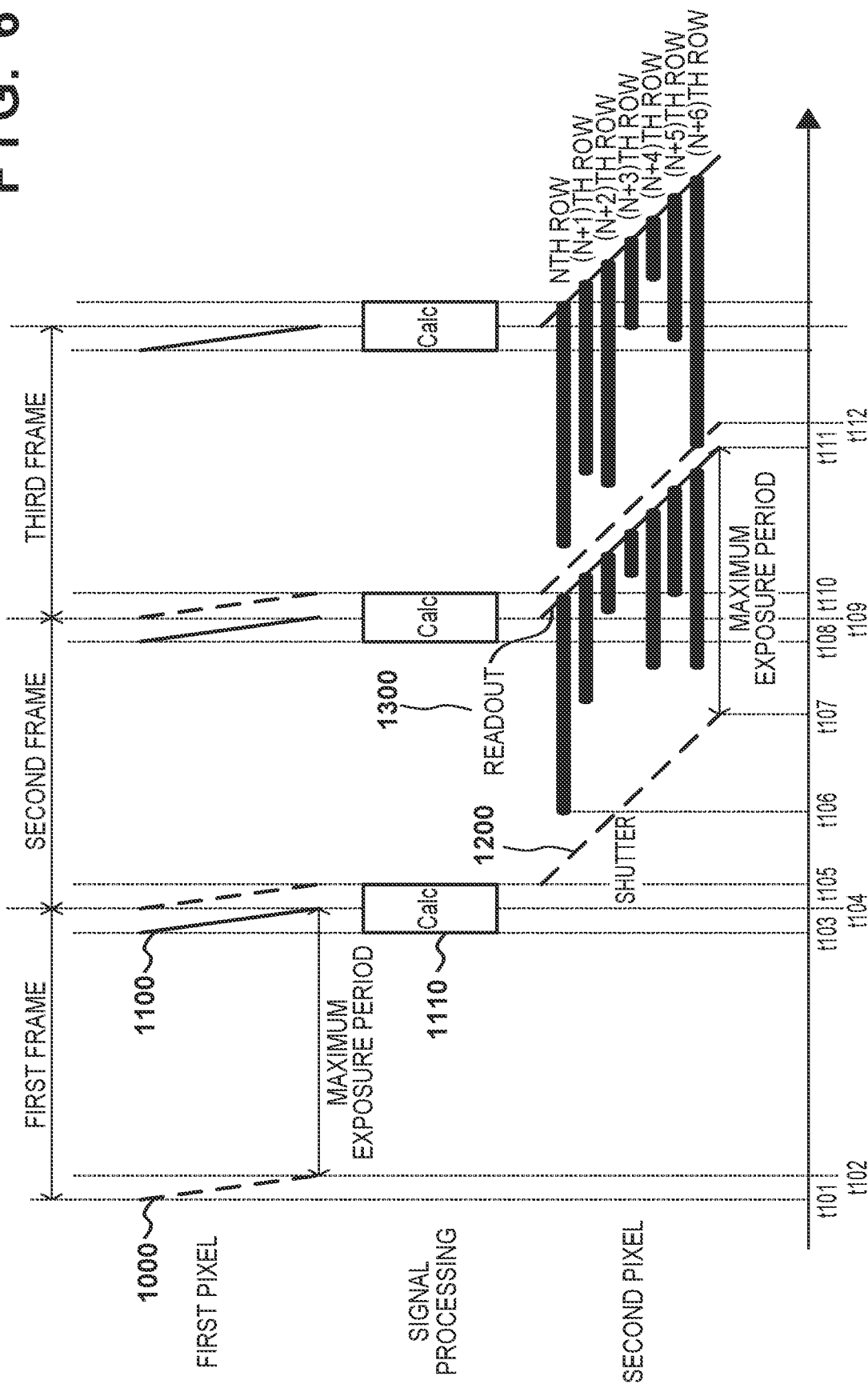
FIG. 6 is a timing chart of an operation of the image sensing device of FIG. 1.

FIG. 6 is a timing chart of a case in which an image sensing operation by using the second-type pixels 120 is performed by using a control parameter based on signals obtained from performing an image sensing operation by using the first-type pixels 110 which perform the thinned-out reading operation. The arrangement of the image sensing device 100 is the same as those shown in FIGS. 1 and 2A.

A shutter operation 1000 (broken line) is a shutter operation of performing an image sensing operation by the first-type pixels 110. The longitudinal direction of the broken line indicating the shutter operation 1000 represents the column direction (or the pixel row position at which the shutter operation is to be performed). The shutter operation 1000 indicates that the vertical scanning circuit 102 performs scanning from the upper end to the lower end or from the lower end to the upper end of the pixel array 101, and that an exposure operation of the first-type pixels 110 of each first-type pixel row is to be started. More specifically, in the shutter operation 1000, the exposure operation is started after a Hi signal is supplied to the signal lines PTX1 and PRES1 of each selected first-type pixel row, the photoelectric conversion element PD of each first-type pixel 110 is reset, and the signal line PTX1 subsequently changes to a Lo signal.

A readout operation 1100 (solid line) is an operation of reading out signals from the first-type pixels 110. The signals of the first-type pixels 110 of the 1st row selected by the vertical scanning circuit 102 are read out simultaneously. At this time, the thinned-out reading operation of reading out signals from the first-type pixels 110 is performed at the same timings as those described above in FIGS. 4 and 5B. The period between the shutter operation 1000 and the readout operation 1100 is the maximum width of a period (to be referred to as a first image-sensing period hereinafter) of image-sensing by the first-type pixels 110, and the interval between the shutter operation 1000 and the readout operation 1100 may be shortened as necessary.

In a signal processing operation 1110, each control parameter to be used in the subsequent image sensing operation by the second-type pixels 120 (to be described later) is determined by the controller 105 based on the signals of the first-type pixels 110 that have undergone readout by the readout circuits 103. The control parameter includes, for example, an exposure time of accumulating charges in the image sensing operation by the second-type pixels 120, the gain of each readout circuit 103, a conversion resolution to be used when performing AD conversion, a region (ROI: Region of Interest) where the signal readout is to be performed in the pixel array 101, or the like. The control parameter may also be used for the shutter speed setting, the ISO sensitivity setting, the f-number setting, the focusing of the lens, the signal processing level (for example, the intensity of the noise removal), and the like which are to be made in the camera for the image sensing operation by the second-type pixels 120. A shutter operation 1200 (broken line) is the shutter operation of the second-type pixels 120. A readout operation 1300 is the readout operation of reading out signals from the second-type pixels 120. The period between the shutter operation 1200 and the readout operation 1300 is the maximum width of a period (to be referred to as a second image-sensing period hereinafter) of image-sensing by the second-type pixels 120.

The operation of the image sensing device 100 will be described next. First, the controller 105 performs control so that an image sensing operation is performed by the first-type pixels 110 in the first image-sensing operation. At time t101, scanning for the shutter operation 1000 is started from the first-type pixel row on the upper end of the pixel array 101, and the shutter operation 1000 is completed at time t102. Next, at time t103, the readout operation 1100 is started. The controller 105 causes the readout circuits 103, arranged in corresponding columns, to read out signals generated by the first-type pixels 110 by the image sensing operation, sequentially from the first-type pixel row on the upper-end side of the pixel array 101. The controller 105 starts the signal processing operation 1110 by using these signals. In the signal processing operation 1110, based on the signals generated by the first-type pixels 110 of an arbitrary region which have already undergone readout as the control parameters, the controller 105 determines the length of the exposure time of charge accumulation in the second image-sensing operation by the second-type pixels 120 in each row. Although the exposure time is determined for each row in this case, the exposure time may be determined for each plurality of rows. If the image sensing device 100 also includes an exposure control mechanism for each arbitrary number of pixels in the row direction, the length of the exposure time for each arbitrary column may also be determined in addition to the exposure time for each row. The control parameter may not only be the exposure time of the second-type pixels 120 but also be the gain of each readout circuit 103 or the conversion resolution of AD conversion in the readout operation 1300 of reading out signals from the image sensing operation by the second-type pixels 120 or the readout region where the signals are to be read out in the pixel array 101. For example, since the exposure time and the gain can be suitably set for each arbitrary row or for each region, the dynamic range of the image sensing device 100 can be increased. In this manner, the controller 105 can determine the control parameter for at least one of not less than one row in the pixel array 101 and not less than one column in the pixel array 101.

The control parameters determined by the controller 105 are fed back to the vertical scanning circuit 102 and the readout circuits 103 via the control parameter line 106. At time t104, after the signals of the first-type pixels 110 of every first-type pixel row have been read out, the shutter operation 1000 of the first image-sensing operation of the second frame can be started. The thinned-out reading operation of reading out signals from the first-type pixels 110 at time t103 to time t104 is performed at the same timing as described above in FIGS. 4 and 5B.

Next, in the second image-sensing operation performed after the first image-sensing operation, the controller 105 performs control so that an image sensing operation will be performed by the second-type pixels 120 in accordance with each determined control parameter. More specifically, when each control parameter has been determined by the controller 105, the shutter operation 1200 of the second image-sensing operation is started at time t105 after every shutter operation 1000 of the first image-sensing operation has been completed. Since the shutter operation 1200 of each row is performed based on the exposure time determined for each row by the signal processing operation 1110, for example, the shutter operation for an nth row is performed at time t106 and the exposure of the nth row is started. The exposure of each subsequent row is started in the same manner. In the period from time t108 to time t109, the readout operation 1100 of the second frame in the first image-sensing operation is performed. When the signals generated from all of the first-type pixels 110 have been read out, the readout operation 1300 of the first frame of the second image-sensing operation is started, and the readout of the signals generated in all of the second-type pixels 120 is completed at time t111.

As the second-type pixels 120 are arranged in all of the rows of the pixel array 101 and are present in the same column for adjacent rows in most of the rows, the second-type pixels 120 need to be scanned and subjected to readout for each row. Hence, the scanning time in the readout operation 1100 of reading out signals from the first-type pixels 110 can be shorter than the scanning time of the readout operation 1300 of reading out signals from the second-type pixels 120. Although a detailed timing chart of the readout operation 1300 will not be illustrated, it is the same as that when the entire signal line group 130 is changed to a Lo signal in FIG. 3. The subsequent operation is the same as that of the previous frame, and thus a description will be omitted.

The above-described embodiment showed a case in which the exposure time of accumulating charges in the second image-sensing operation is controlled as a control parameter. However, the controller 105 may control, as a control parameter, the gain of each readout circuit 103, the conversion resolution of AD conversion in the readout operation 1300 of reading out signals from the image sensing operation by the second-type pixels 120, or the readout region where the signals are to be read out in the pixel array 101. In this case, the exposure time of the second-type pixels 120 need not be controlled as a control parameter or a plurality of parameters including the exposure time may be combined and controlled. The control parameter may be used to control the external operation of the image sensing device. For example, the control parameter can be used for the shutter speed setting, the ISO sensitivity setting, the f-number setting, the focusing of the lens, the signal processing level (for example intensity of the noise removal), and the like which are to be made in the camera for the image sensing operation by the second-type pixels 120. Here, consider a case in which the exposure time of accumulating charges in the second image-sensing operation is not used as the control parameter in each of the image sensing operations in which the image sensing device 100 repeats one first image-sensing operation and one second image-sensing operation. In other words, consider a case in which the control parameter is the gain of each readout circuit 103, the conversion resolution of each readout circuit 103, or the readout region where the signals are to be read out in the pixel array 101. In this case, the controller 105 may perform the second image-sensing operation by using a first control parameter determined by the first image-sensing operation in the same image-sensing operation period. For example, the controller 105 may feed back, to the readout operation 1300 of the immediately following second image-sensing operation (time t109 to time t110), the control parameter determined based on the signals of the first-type pixels 110 obtained in the readout operation 1100 of the first image-sensing operation performed at time t108 to time t109.

As described above, based on the information of the first-type pixels 110 in which the speed of the readout operation 1100 has been increased, the control parameter for the signals of the second-type pixels 120 to be read out next is determined. As a result, it is possible to determine a suitable image-sensing condition by tracking a high-speed moving object.

A processing operation of cutting out a suitable region corresponding to a higher speed moving object by making a determination to reduce the next signal readout region in a stepwise manner based on the information of the first-type pixels 110 obtained in the high-speed first image-sensing operation (thinned-out reading operation) will be described next. Here, an example in which the above-described first-type pixels 110 operated by dividing the first-type pixels into two pixel groups of first preliminary image sensing pixels 111 and second preliminary image sensing pixels 112 will be described.

Figure 7:
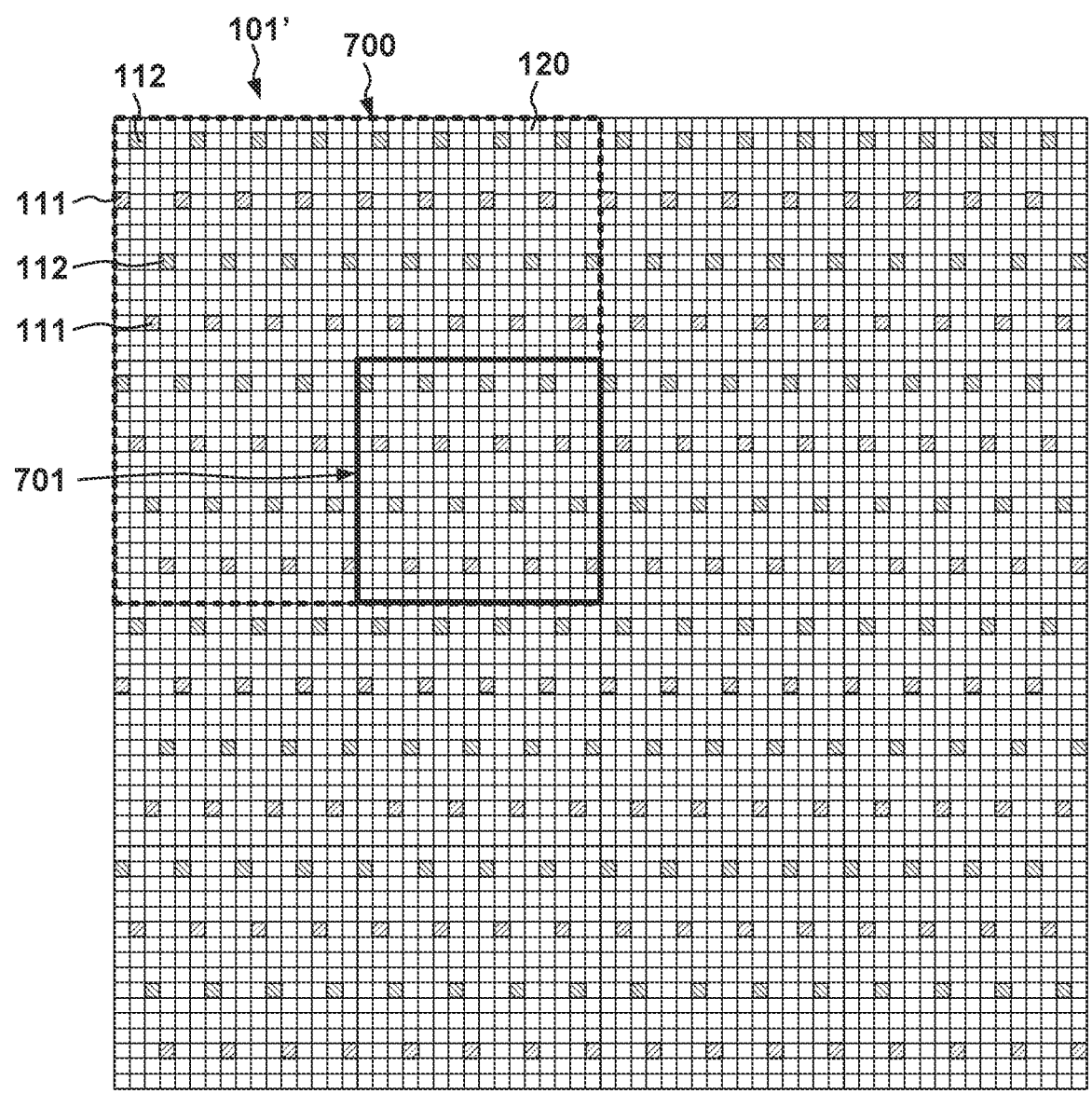
FIG. 7 is a view showing an example of the arrangement of a pixel array of the image sensing device of FIG. 1.

FIG. 7 is a view showing the arrangement of the pixels of a pixel array 101' according to this embodiment. The pixel array 101' includes 64 rows×64 columns of pixels. In this embodiment, a first preliminary image sensing operation and a second preliminary image sensing operation performed after the first preliminary image sensing operation are performed as the first image-sensing operation in which the thinned-out reading operation is performed. Hence, the first-type pixels 110 are classified into the first preliminary image sensing pixels 111 to be used for the first preliminary image sensing operation of the first-type pixels 110 and the second preliminary image sensing pixels 112 different from the first preliminary image sensing pixels 111 to be used for the second preliminary image sensing operation. In this embodiment, the first preliminary image sensing pixel 111 is arranged from the 5th row of the pixel array 101' at an interval of 8 rows. The second preliminary image sensing pixel 112 is arranged from the 1st row at an interval of 8 rows. Components other than the pixel array 101' may be the same as those in the arrangement shown in FIG. 1, and thus a description of components other than the pixel array 101' will be omitted.

FIG. 8 is a timing chart for explaining the operation of the image sensing device 100 that includes the pixel array 101'. A shutter operation 8000 is the shutter operation of the first preliminary image sensing pixels 111. The readout operation 8100 is the readout operation of the first preliminary image sensing pixels 111. The period between the shutter operation 8000 and the readout operation 8100 is the maximum width of a first preliminary image sensing period in the first preliminary image sensing pixels 111. A shutter operation 8200 is the shutter operation of the second preliminary image sensing pixels 112. A readout operation 8300 is the readout operation of the second preliminary image sensing pixels 112. The period between the shutter operation 8200 and the readout operation 8300 is the maximum width of a second preliminary image sensing period in the second preliminary image sensing pixels 112.

In a signal processing operation 8110, after the first preliminary image sensing operation, a preliminary image sensing parameter of the second preliminary image sensing operation by the second preliminary image sensing pixels 112 is determined by the controller 105 based on the signals of the first preliminary image sensing pixel 111 read out by the readout circuits 103. In a signal processing operation 8310, after the second preliminary image sensing operation, the control parameter of an image sensing operation by the second-type pixels 120 is determined by the controller 105 based on the signals of the second preliminary image sensing pixels 112 read out by the readout circuits 103. The preliminary image sensing parameter and the control parameter determined by the signal processing operation 8110 and the signal processing operation 8310, respectively, are the same as the control parameter described with reference to FIG. 6, and thus a description will be omitted.

The operation of the image sensing device 100 which includes the pixel array 101' will be described next. First, in the period of time t131 to time t132, the shutter operation 8000 of the first preliminary image sensing operation is performed. Next, in the period of time t133 to time t134, the readout operation 8100 of the first preliminary image sensing pixel is performed. After the start of the readout operation 8100, the signal processing operation 8110 of the first preliminary image sensing operation is started. In the signal processing operation 8110, the controller 105 determines, based on the signals generated by the first preliminary image sensing pixels 111 of an arbitrary region that has at least already undergone readout, a signal readout region 700 in the pixel array 101' in the image sensing operation using the second preliminary image sensing pixels 112. For example, the region 700 that includes specific image-sensing target region may be determined from the signals obtained in the first preliminary image sensing operation. In the arrangement shown in FIG. 7, the controller 105 selects, from the pixel array 101' on which 64 rows×64 columns of pixels are arranged, the region 700 on which 32 rows×32 columns of pixels are arranged. The controller 105 feeds back, to the vertical scanning circuit 102 and the horizontal scanning circuit 104, the signal readout region 700 of the image sensing operation using the second preliminary image sensing pixels 112 determined via the control parameter line 106. At time t134, after all of the first preliminary image sensing pixels 111 have undergone readout, the shutter operation 8000 of the second frame in the first preliminary image sensing operation can be started. Here, the region (that is, the entire region of the pixel array 101) where the first preliminary image sensing pixels 111, which are the first-type pixels 110 whose signals are to be read out in the first preliminary image sensing operation, are to be arranged in the pixel array 101 includes the region 700 where the second preliminary image sensing pixels 112 which are the first-type pixels 110 whose signals are to be read out in the second preliminary image sensing operation in the pixel array 101 are arranged. Also, although this embodiment has set the region 700 as a region where 32 rows×32 columns of pixels are arranged, the present invention is not limited to this, and the region may be set appropriately.

After the shutter operation 8200 of the second preliminary image sensing operation has been performed in the period of time t135 to time t136, the readout operation 8100 of the second frame in the first preliminary image sensing operation is performed in the period of time t137 to time t138. After all of the readout operations 8100 have been completed, the readout operation 8300 of the second preliminary image sensing operation is performed in the period of time t138 to time t139. After the start of the readout operation 8300, the signal processing operation 8310 of the second preliminary image sensing operation is started. In the signal processing operation 8310, the controller 105 determines, based on the signals generated by the second preliminary image sensing pixels 112 of an arbitrary region that has at least already undergone readout, a signal readout region 701 in the pixel array 101' in the second image sensing operation using the second-type pixels 120. For example, the region 701 which includes a specific image sensing target may be determined from signals obtained in the second preliminary image sensing operation. In the arrangement shown in FIG. 7, the controller 105 selects, from the region 700 where 32 rows×32 columns of pixels are arranged, the region 701 where 16 rows×16 columns of pixels are arranged. The controller 105 feeds back, to the vertical scanning circuit 102 and the horizontal scanning circuit 104, the region 701 which has been determined via the control parameter line 106 and from which signals are to be read out in the second image-sensing operation using the second-type pixels 120. At time t139, after all of the second preliminary image sensing pixels 112 have undergone readout, the shutter operation 8200 of the second frame can be started. Here the region 700, where the second preliminary image sensing pixels 112 which are the first-type pixels 110 whose signals are to be read in the second preliminary image sensing operation in the pixel array 101 are arranged, includes the region 701 where the second-type pixels 120 whose signals are to be read in the second image-sensing operation in the pixel array 101 are arranged. In this embodiment, the region 701 is a region in which 16 rows×16 columns of pixels are arranged. However, the present invention is not limited to this, and the region may be set appropriately.

After the shutter operation 8200 has been performed, the shutter operation 1200 is performed in the period from time t140 to time t141, and the readout operation 1300 is performed in the period from time t142 to time t143. At time t143, the readout of signals generated by the second-type pixels 120 arranged in the region 701 is completed.

In the operation of the image sensing device 100 shown in FIGS. 7 and 8, the controller 105 need not control, as the second preliminary image sensing parameter and the control parameter, the exposure time in the image sensing operation by the second preliminary image sensing pixels 112 and the second-type pixels 120. If the exposure time is not to be controlled, the controller 105 may feed back, to the immediately following readout operation 8300, the preliminary image sensing parameter determined based on the signals of the first preliminary image sensing pixels 111 obtained in the readout operation 8100. In the same manner, the controller 105 may feed back, to the immediately following readout operation 1300, the preliminary image sensing parameter determined based on the signals of the first preliminary image sensing pixels 111 obtained in the readout operation 8300.

In the operation of the image sensing device 100 shown in FIGS. 7 and 8, the preliminary image sensing parameter and the control parameter need not only be those of the signal readout regions (the regions 700 and 701) in the pixel array 101. The preliminary image sensing parameter may be the exposure time during which charge accumulation is performed in the second preliminary image sensing operation by using the second preliminary image sensing pixels 112. The control parameter may be the exposure time during which the charge accumulation is performed in the second image-sensing operation by using the second-type pixels 120. The preliminary parameter and the control parameter may be the conversion resolution of the AD conversion or the gain of the readout circuits 103 when the readout operations 8300 and 1300 of reading signals obtained in the image sensing operation by the second preliminary image sensing pixels 112 and the second-type pixels 120. The regions 700 and 701 may be selected by dividing the pixel array 101 into appropriate sizes in advance or an arbitrary region may be selected from the pixel array 101 based on the signals obtained in the first preliminary image sensing operation and the second preliminary image sensing operation.

As described above, the next signal readout region is determined stepwise based on the information of the thinned-out pixels whose readout operation speed has been increased. As a result, it is possible to perform a more suitable image sensing operation by tracking a higher speed moving object.

As an application example of the image sensing device 100 according to the above-described embodiment, a camera incorporating the image sensing device 100 will be exemplified hereinafter. Here, the concept of a camera includes not only a device whose main purpose is image capturing but also a device (for example, a personal computer, mobile terminal, etc.) that auxiliary has an image capturing function.

Figure 9A:
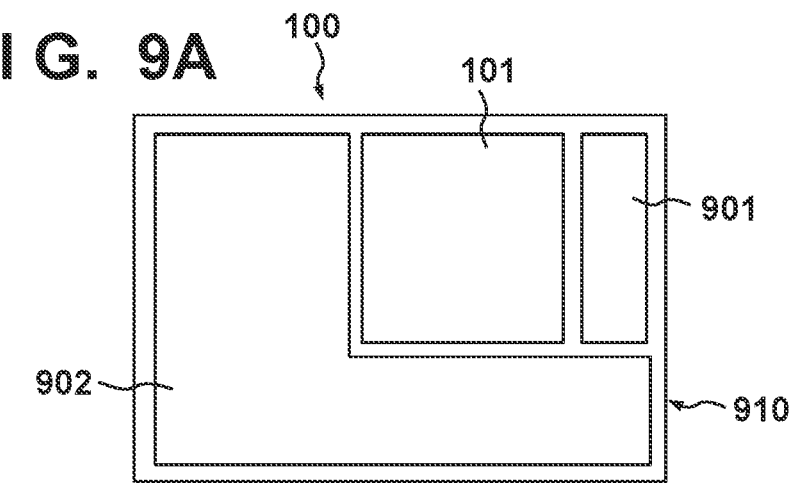
FIGS. 9A to 9D are views showing examples of the arrangement of a camera incorporating the image sensing device.
Figure 9B:
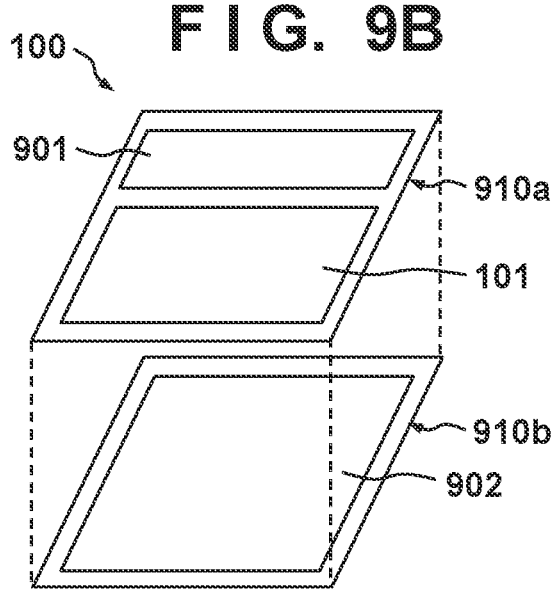
Figure 9C:
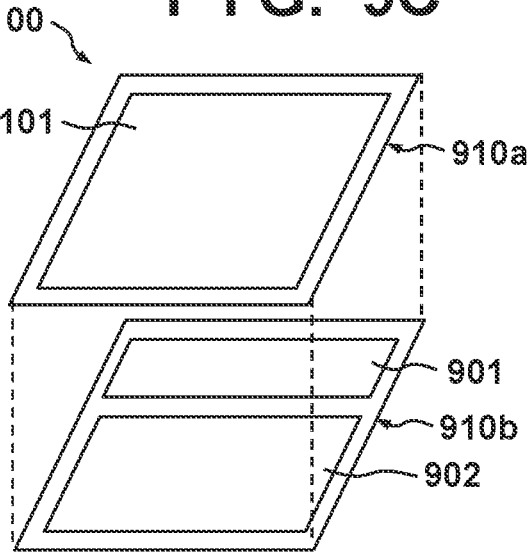

As shown in FIG. 9A, the image sensing device 100 may include, in one semiconductor chip 910, the pixel array 101, a signal processor 902, and a control circuit 901 that includes the vertical scanning circuit 102, the readout circuits 103, the horizontal scanning circuit 104, and controller 105. The image sensing device 100 may be formed from a plurality of semiconductor chips. For example, the image sensing device 100 includes a semiconductor chip 910*a* and a semiconductor chip 910*b* which are stacked in the manner shown in FIG. 9B. In this case, the control circuit 901 and the pixel array 101 may be included in the semiconductor chip 910*a*, and the signal processor 902 may be included in the semiconductor chip 910*b*. The image sensing device 100 may include the pixel array 101 in the semiconductor chip 910*a* and the control circuit 901 and the signal processor 902 in the semiconductor chip 910*b* as shown in FIG. 9C. In a case in which the image sensing device 100 has a structure in which the semiconductor chip 910*a* and the semiconductor chip 910*b* are stacked in the manner shown in FIGS. 9B and 9C, the semiconductor chip 910*a* and the semiconductor chip 910*b* are electrically connected to each other by direct connection of wiring lines, through-silicon vias, or bumps. The signal processor 902 can include an A/D conversion circuit and a processor (ISP: Image Signal Processor) that processes digital data of the A/D-converted image data.

Figure 9D:
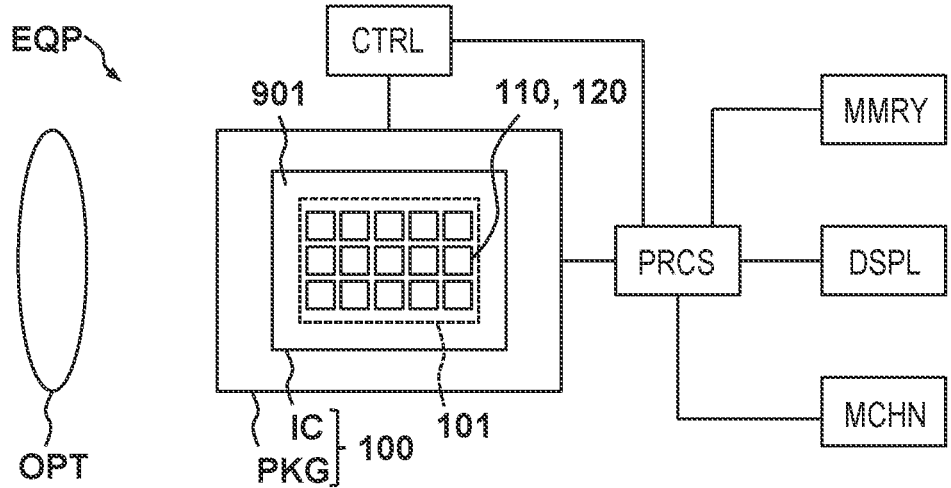

FIG. 9D is a schematic view of an equipment EQP incorporating the image sensing device 100. An electronic equipment such as a camera, an information equipment such as a smartphone, a transportation equipment such as an automobile or an airplane, or the like is an example of the equipment EQP. The image sensing device 100 can include, other than a semiconductor device IC which includes the semiconductor chip on which the pixel array 101 is arranged, a package PKG that contains the semiconductor device IC. The package PKG can include a base on which the semiconductor device IC is fixed and a lid member made of glass or the like which faces the semiconductor device IC, and connection members such as a bump and a bonding wire that connect a terminal arranged in the base and a terminal arranged in the semiconductor device IC to each other. The equipment EQP can further include at least one of an optical system OPT, a control device CTRL, a processing device PRCS, a display device DSPL, and a memory device MMRY. The optical system OPT forms images in the image sensing device 100 and is formed from, for example, a lens, a shutter, and a mirror. The control device CTRL controls the operation of the image sensing device 100 and is a semiconductor device such as an ASIC. The processing device PRCS processes signals output from the image sensing device 100 and is a semiconductor device such as a CPU or an ASIC for forming an AFE (Analog Front End) or a DFE (Digital Front End). The display device DSPL is an EL display device or a liquid crystal display device that displays information (image) acquired by the image sensing device 100. The memory device MMRY is a magnetic device or a semiconductor device for storing information (image) acquired by the image sensing device 100. The memory device MMRY is a volatile memory such as an SRAM, DRAM, or the like or a nonvolatile memory such as a flash memory, a hard disk drive, or the like. A mechanical device MCHN includes a driving unit or propulsion unit such as a motor, an engine, or the like. The mechanical device MCHN in the camera can drive the components of the optical system OPT for zooming, focusing, and shutter operations. In the equipment EQP, signals output from the image sensing device 100 are displayed on the display device DSPL and are transmitted externally by a communication device (not shown) included in the equipment EQP. Hence, it is preferable for the equipment EQP to further include the memory device MMRY and the processing device PRCS that are separate from a storage circuit unit and calculation circuit unit included in the control circuit 901 and the signal processor 902 in the image sensing device 100.

Figure 10A:
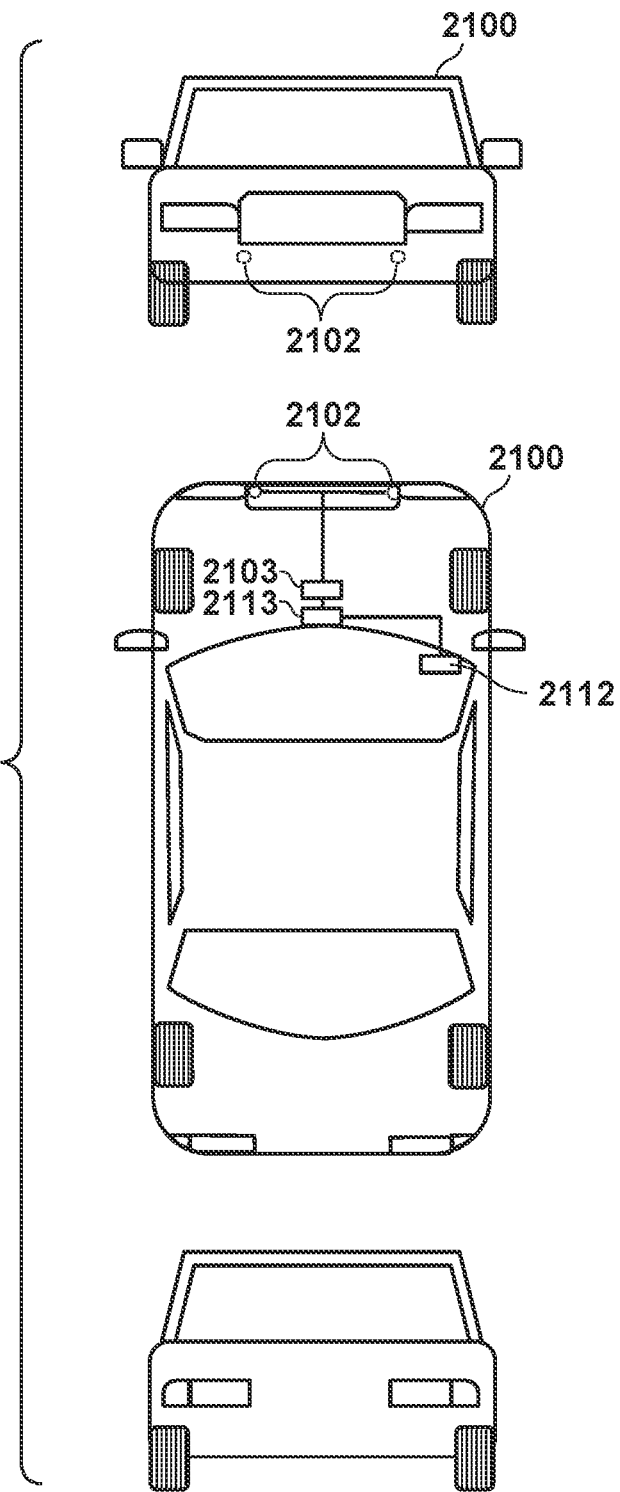
FIGS. 10A and 10B are views showing examples of a transportation equipment mounted with the image sensing device of FIG. 1.

As described above, the image sensing device 100 according to this embodiment can track a high speed moving object. Hence, a camera incorporating the image sensing device 100 is applicable as a monitoring camera, an onboard camera mounted in a transportation equipment such as an automobile or an airplane, or the like. A case in which the camera incorporating the image sensing device 100 is applied to the transportation equipment will be exemplified here. A transportation equipment 2100 is, for example, an automobile including an onboard camera 2101 shown in FIGS. 10A and 10B. FIG. 10A schematically shows the outer appearance and the main internal structure of the transportation equipment 2100. The transportation equipment 2100 includes an image sensing device 2102, an image sensing system ASIC (Application Specific Integrated Circuit) 2103, a warning device 2112, and a control device 2113.

The above-described image sensing device 100 is used for the image sensing device 2102. The warning device 2112 warns a driver when it receives an abnormality signal from an image-sensing system, a vehicle sensor, a control unit, or the like. The control device 2113 comprehensively controls the operations of the image sensing system, the vehicle sensor, the control unit, and the like. Note that the transportation equipment 2100 need not include the control device 2113. In this case, the image sensing system, the vehicle sensor, and the control unit each can individually include a communication interface and exchange control signals via a communication network (for example, CAN standard).

Figure 10B:
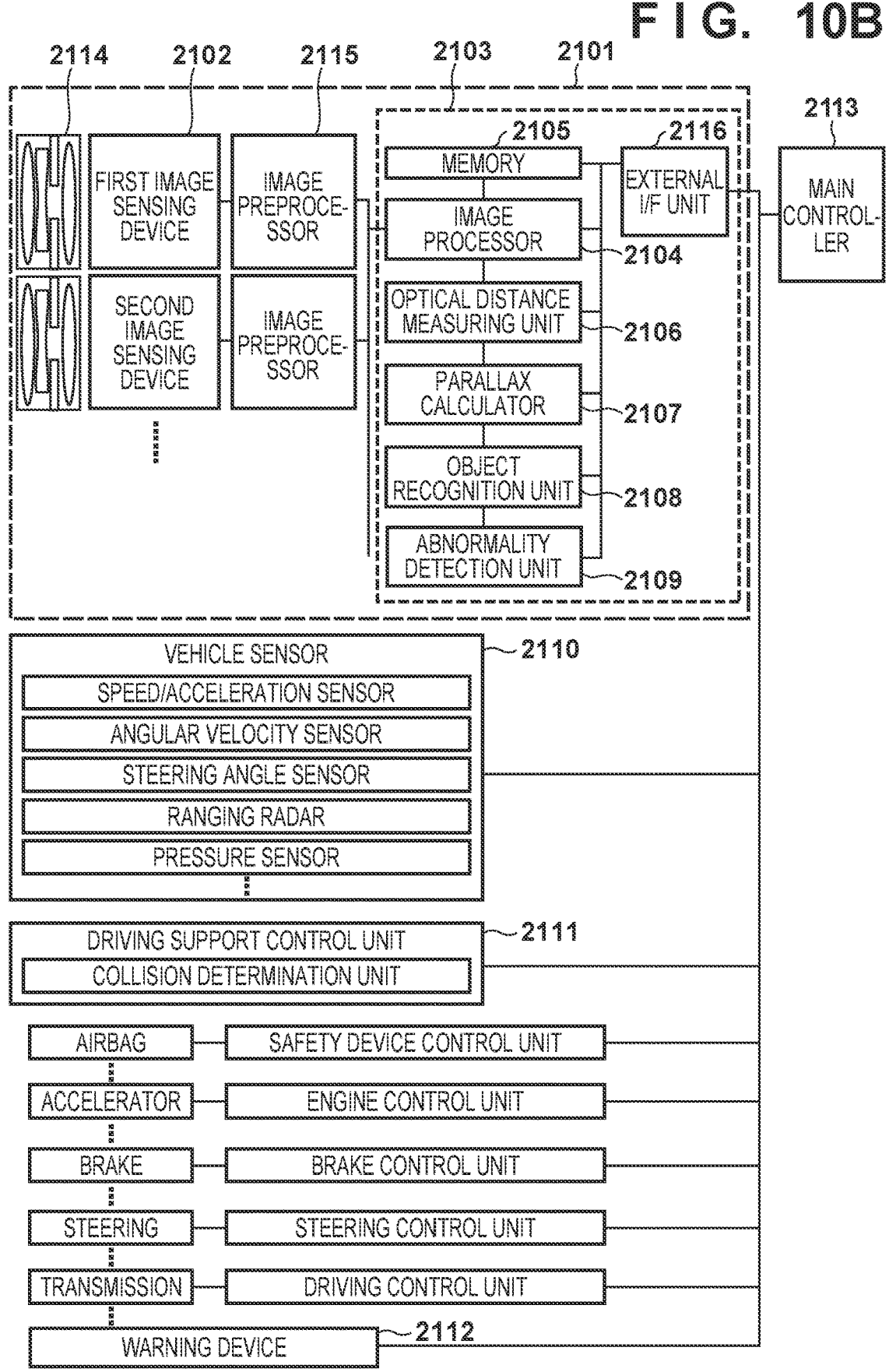

FIG. 10B is a block diagram showing the system arrangement of the transportation equipment 2100. The transportation equipment 2100 includes the first image sensing device 2102 and the second image sensing device 2102. That is, the onboard camera according to this embodiment is a stereo camera. An object image is formed by an optical unit 2114 on each image sensing device 2102. An image signal output from each image sensing device 2102 is processed by an image pre-processor 2115 and transmitted to the image sensing system ASIC 2103. The image pre-processor 2115 performs processing such as S-N calculation and synchronization signal addition. The above-described signal processor 902 corresponds to at least a part of the image pre-processor 2115 and the image sensing system ASIC 2103.

The image sensing system ASIC 2103 includes an image processor 2104, a memory 2105, an optical distance measuring unit 2106, a parallax calculator 2107, an object recognition unit 2108, an abnormality detection unit 2109, and an external interface (I/F) unit 2116. The image processor 2104 generates an image signal by processing signals output from the pixels of each image sensing device 2102. The image processor 2104 also performs correction of image signals and interpolation of abnormal pixels. The memory 2105 temporarily holds the image signal. The memory 2105 may also store the position of a known abnormal pixel in the image sensing device 2102. The optical distance measuring unit 2106 uses the image signal to perform focusing or distance measurement of an object. The parallax calculator 2107 performs object collation (stereo matching) of a parallax image. The object recognition unit 2108 analyzes image signals to recognize objects such as transportation equipment, a person, a road sign, a road, and the like. The abnormality detection unit 2109 detects the fault or an error operation of the image sensing device 2102. When detecting a fault or an error operation, the abnormality detection unit 2109 transmits a signal indicating the detection of an abnormality to the control device 2113. The external I/F unit 2116 mediates the exchange of information between the units of the image sensing system ASIC 2103 and the control device 2113 or the various kinds of control units.

The transportation equipment 2100 includes a vehicle information acquisition unit 2110 and a driving support unit 2111. The vehicle information acquisition unit 2110 includes vehicle sensors such as a speed/acceleration sensor, an angular velocity sensor, a steering angle sensor, a ranging radar, and a pressure sensor.

The driving support unit 2111 includes a collision determination unit. The collision determination unit determines whether there is a possibility of collision with an object based on the pieces of information from the optical distance measuring unit 2106, the parallax calculator 2107, and the object recognition unit 2108. The optical distance measuring unit 2106 and the parallax calculator 2107 are examples of distance information acquisition units that acquire distance information of a target object. That is, distance information is pieces of information related to the parallax, the defocus amount, the distance to the target object and the like. The collision determination unit may use one of these pieces of distance information to determine the possibility of a collision. Each distance information acquisition unit may be implemented by dedicated hardware or a software module.

An example in which the driving support unit 2111 controls the transportation equipment 2100 so it does not collide against another object has been described. However, it is also applicable to control of automatic driving following another vehicle or control of automatic driving not to drive off a lane.

The transportation equipment 2100 also includes driving devices, which are used for movement or supporting a movement, such as an air bag, an accelerator, a brake, a steering, a transmission, an engine, a motor, wheels, propellers, and the like. The transportation equipment 2100 also includes control units for these devices. Each control unit controls a corresponding driving device based on a control signal of the control device 2113.

The image sensing system used in the embodiment is applicable not only to an automobile and a railway vehicle but also to, for example, transportation equipment such as a ship, an airplane, or an industrial robot. The image sensing system is also applicable not only to the transportation equipment but also widely to equipment using object recognition such as an ITS (Intelligent Transportation System).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-156884, filed Aug. 15, 2017 which is hereby incorporated by reference wherein in its entirety.

What is claimed is:

1. An image sensing device that comprises a pixel array in which a plurality of pixels are arranged in a matrix and a plurality of readout circuits configured to read out signals from the pixel array, the plurality of pixels comprising:
 a first pixel which belongs to a first pixel row of the pixel array and a first pixel column of the pixel array,
 a second pixel which belongs to a second pixel row of the pixel array and the first pixel column of the pixel array, and
 a third pixel which belongs to the second pixel row of the pixel array and a second pixel column of the pixel array, and the plurality of readout circuits comprising a first readout circuit connected to the first pixel and the second pixel and a second readout circuit connected to the third pixel, wherein the image sensing device performs a first image sensing operation and performs a second image sensing operation after the first image sensing operation, wherein in the first image sensing operation, signal read out from the first pixel by the first readout circuit and signal read out from the third pixel by the second readout circuit are performed simultaneously, and wherein in the second image sensing operation, signal read out from the first pixel by the first readout circuit and signal read out from the third pixel by the second readout circuit are performed separately, and signal read out from the first pixel by the first readout circuit and signal read out from the second pixel by the first readout circuit are performed separately, and wherein a controller determines, based on a signal generated by the first image sensing operation, a control parameter which is to be used to control the second image sensing operation, wherein the second image sensing operation is performed based on the control parameter, wherein a plurality of image sensing operations are repeated over a plurality of periods, wherein an image sensing operation performed in one period of the plurality of periods includes:

reading out a first plurality of signals by the plurality of readout circuits, the first plurality of signals being generated by the first image sensing operation, and reading out a second plurality of signals by the plurality of readout circuits, the second plurality of signals being generated by the second image sensing operation, wherein the second plurality of signals are read out after the first plurality of signals are read out, and wherein the controller performs the second image sensing operation in the one period by using the control parameter determined by the first image sensing operation in the one period.

2. The device according to claim 1, wherein the first pixel and the second pixel are connected to the first readout circuit via a first signal line and the third pixel is connected to the second readout circuit via a second signal line, and wherein in the second image sensing operation, signal read out from the second pixel by the first readout circuit and signal read out from the third pixel by the second readout circuit are performed simultaneously.

3. The device according to claim 2, wherein the plurality of pixels comprise a fourth pixel which belongs to the first pixel row and the second pixel column and is connected to the second readout circuit, wherein in the first image sensing operation, signal read out from the second pixel by the first readout circuit and signal read out from the fourth pixel by the second readout circuit are not performed, and wherein in the second image sensing operation, the signal read out from the second pixel by the first readout circuit and signal read out from the fourth pixel by the second readout circuit are performed separately.

4. The device according to claim 3, wherein in the first image sensing operation, the image sensing device does not perform signal read out from a pixel row arranged between the first pixel row and the second pixel row.

5. The device according to claim 1, wherein the plurality of pixels comprise a plurality of first-type pixels that include the first pixel and the third pixel, and whose signals are read out simultaneously with the signals of the first pixel and the third pixel, and a plurality of second-type pixels that include the second pixel, in each of pixel rows to which the plurality of the first-type pixels belong, each of the plurality of first-type pixels is arranged for every M pixels (M is a positive integer not less than 2), in the pixel array, the pixel row to which the plurality of the first-type pixels belong is arranged for every N rows (N is an integer not less than 2), and signal readout is performed simultaneously from first-type pixels belonging to continuous L pixel rows (L is an integer not less than 2) among pixel rows to which the plurality of the first-type pixels belong.

6. The device according to claim 5, further comprising in each of the pixel rows to which the plurality of the first-type pixels belong, a first signal line group configured to control the first-type pixels belonging to each of the pixel rows among the plurality of first-type pixels, and a second signal line group configured to control a pixel other than the plurality of first-type pixels.

7. The device according to claim 6, further comprising a third signal line group configured to control a pixel included in each of plurality of pixel rows which do not include the plurality of first-type pixels, and a total signal line count of the first signal line group and the second signal line group and a line count of the third signal line group are equal to each other.

8. The device according to claim 1, wherein the control parameter comprises at least one of an exposure time of accumulating charges, a gain of the plurality of readout circuits, conversion resolution of the plurality of readout circuits, and a signal readout region of the pixel array in the second image sensing operation.

9. The device according to claim 1, wherein the controller determines the control parameter for at least one of not less than one row of the pixel array and not less than one column of the pixel array.

10. The device according to claim 1, wherein an image sensing operation performed in another one period of the plurality of periods includes:

reading out a third plurality of signals by the plurality of readout circuits, the third plurality of signals being generated by the first image sensing operation, and reading out a fourth plurality signals by the plurality of readout circuits, the fourth plurality of signals being generated by the second image sensing operation, wherein the fourth plurality of signals are read out after the third plurality of signals are read out, and wherein the controller performs the second image sensing operation in the other one period by using a control parameter determined by the first image sensing operation in the another one period.

11. The device according to claim 1, wherein the control parameter is one of a gain of the plurality of readout circuits in the second image sensing operation, conversion resolution of the plurality of readout circuits, and a signal readout region of the pixel array.

12. The device according to claim 1, wherein the first image sensing operation comprises a first preliminary image sensing operation and a second preliminary image sensing operation which is performed after the first preliminary image sensing operation, the plurality of pixels comprise a plurality of first-type pixels that include the first pixel and the third pixel, and a plurality of second-type pixels that include the second pixel, the plurality of first-type pixels comprise a first preliminary image sensing pixel which is used in the first preliminary image sensing operation and a second preliminary image sensing pixel which is different from the first preliminary image sensing pixel and is used in the second preliminary image sensing operation, and the controller determines, based on a signal generated by the first preliminary image sensing pixel in the first preliminary image sensing operation, a preliminary image sensing parameter to be used for accumulating charges in the second preliminary image sensing operation and controlling the second preliminary image sensing operation, the controller causes the plurality of readout circuits to read out each signal generated by the second preliminary image sensing pixel in the second preliminary image sensing operation, and the controller determines the control parameter by using the signal generated by the second preliminary image sensing pixel.

13. The device according to claim 12, wherein in the pixel array, a region in which the first preliminary image sensing pixel is arranged comprises a region in which the second preliminary image sensing pixel is arranged.

14. The device according to claim 12, wherein in the pixel array, a region in which the second preliminary image sensing pixel is arranged comprises a region in which of the plurality of pixels, a pixel whose signal is to be read out in the second image sensing operation is arranged.

15. The device according to claim 12, wherein the preliminary image sensing parameter comprises at least one of an exposure time of accumulating charges, a gain of the plurality of readout circuits, conversion resolution of the plurality of readout circuits, and a signal readout region of the pixel array in the second preliminary image sensing operation.

16. The device according to claim 5, wherein at least one of a state in which at least one of the integer L, the integer M, and the integer N is not less than 3, and a state in which at least two of the integer L, the integer M, and the integer N are equal to each other is satisfied.

17. The device according to claim 5, wherein at least one of a state in which the integer L is not less than ½ of the integer M and is not more than double of the integer M, and a state in which the integer L is not less ½ of the integer N and is not more than double of the integer N is satisfied.

18. The device according to claim 1, further comprising:
a first semiconductor chip and a second semiconductor chip stacked on each other,
wherein the pixel array is arranged in the first semiconductor chip, and
at least one of the plurality of readout circuits and a signal processor configured to process a signal obtained by the plurality of readout circuits is arranged in the second semiconductor chip.

19. A camera comprising:
an image sensing device defined in claim 1; and
a control device configured to control an operation of the image sensing device.

20. A transportation equipment that includes a driving device, comprising:
an image sensing device defined in claim 1; and
a control device configured to control the driving device based on information acquired by the image sensing device.

* * * * *